United States Patent

Bursell

[11] Patent Number: 5,863,318
[45] Date of Patent: Jan. 26, 1999

[54] ABSORPTION DRYER

[76] Inventor: Martin Bursell, Kungsvägen 7, S-191 45 Sollentuna, Sweden

[21] Appl. No.: 750,872
[22] PCT Filed: Jun. 16, 1995
[86] PCT No.: PCT/SE95/00743
§ 371 Date: Jan. 21, 1997
§ 102(e) Date: Jan. 21, 1997
[87] PCT Pub. No.: WO95/35150
PCT Pub. Date: Dec. 28, 1995

[30] Foreign Application Priority Data

Jun. 22, 1994 [SE] Sweden ................................ 9402212

[51] Int. Cl.$^6$ .................................................. B01D 47/14
[52] U.S. Cl. ................................ 95/295; 95/211; 96/296
[58] Field of Search .......................... 95/149, 211, 231; 55/231, 233, 240, 220; 96/295, 296, 297, 123

[56] References Cited

U.S. PATENT DOCUMENTS

| | | | |
|---|---|---|---|
| 2,095,539 | 10/1937 | Bichowsky | 55/233 |
| 2,388,933 | 11/1945 | Pearson | 55/233 |
| 3,036,417 | 5/1962 | Mare et al. | 55/233 |
| 3,686,830 | 8/1972 | Huntington | 55/233 |
| 3,748,828 | 7/1973 | Lefebvre | 55/233 |
| 3,997,632 | 12/1976 | Kloss | 261/103 |
| 4,249,778 | 2/1981 | McGuire | 55/233 |
| 4,316,726 | 2/1982 | Hopper | 55/233 |
| 5,426,953 | 6/1995 | Meckler | 55/231 |

FOREIGN PATENT DOCUMENTS

| | | |
|---|---|---|
| 2158171 | 5/1973 | Germany . |
| 220238 | 4/1968 | Sweden . |

*Primary Examiner*—Duane S. Smith
*Attorney, Agent, or Firm*—Burns, Doane, Swecker & Mathis, L.L.P.

[57] ABSTRACT

The invention relates to an absorption dryer having a new type of contact device, viz. a contact device including at least one fabric structure, whose threads are such that they can absorb and convey a liquid drying agent and whose apertures are adapted to let through humid gas, whereby the contact between the humid gas and the drying agent occurs essentially radially in respect of the threads, the drying agent preferably being in the plane of the fabric structure and the gas perpendicular thereto through the apertures.

19 Claims, 1 Drawing Sheet

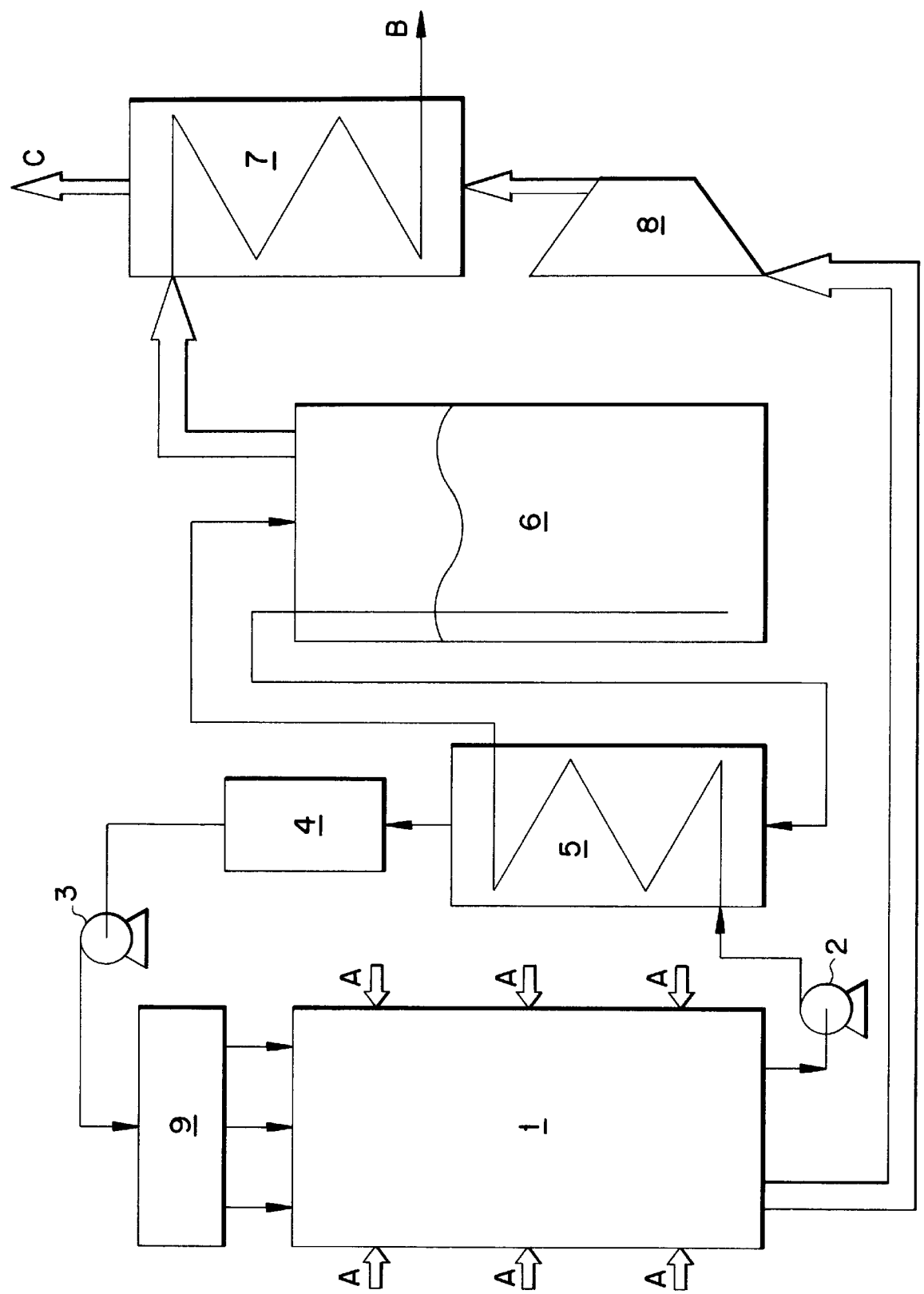

ABSORPTION DRYER

TECHNICAL FIELD

The present invention relates to a new absorption dryer adapted especially to dry humid gas, especially humid air. In other words, the invention relates to the technical field in which the humid gas is contacted with a liquid drying agent, such that the drying agent absorbs moisture from the gas at issue. The drying agent is then regenerated, i.e. relieved of the absorbed moisture, and is again used in the dryer. The novelty of the invention is a drastically simplified and improved construction of the contact means for establishing contact between the humid gas and the liquid drying agent. Moreover, the invention relates to this new contact means itself.

BACKGROUND OF THE INVENTION

The absorption dryer is one of several types of dryer. Two other important types are the adsorption dryer and the condenser dryer. The adsorption dryer operates with a solid drying agent, which is usually regenerated with the aid of electrically heated hot air. The adsorption dryer frequently consists of a fabric structure similar to corrugated fibreboard and impregnated with a drying agent. This structure usually is in the form of a rotor, and the humid air is blown through the flutes and dehumidified. The drying agent can be regenerated by a sector of the rotor being reserved for the regenerating function. The sector is sealed in some suitable manner on both sides of the rotor, and hot air is blown through the rotor material which at that very moment is located in the sector. The advantage of such an adsorption dryer is that it can dehumidify down to low relative moisture contents, since solid drying agents, as a rule, have very low vapour pressures of equilibrium with water vapour in, for instance, air. 10–30% RH thus is quite possible to achieve in exit air, but if supply air is not too humid, suitably not exceeding 50–60% RH.

Although the adsorption dryer must be considered relatively simple in respect of design, it must, however, comprise a driving motor and a comparatively complex rotor. Its great disadvantage is, however, its lack of operation economy. By operation economy is meant the power requirements in kWh per kg of removed water. 1.2–1.5 kWh per kg of water is reasonable for an adsorption dryer. The theoretical power requirements are about 0.75 kWh per kg of water. The reason for the losses in the adsorption dryer is that the rotor, during its continuous rotation between the cold and the warm sector, consumes a considerable amount of power during the exchange of heat. Moreover, the adsorption dryer is not very convenient at high moisture contents and temperatures, or when large amounts of water are to be removed, such as in the case of damage by water or in operating situations in moist and warm climates, including laundry rooms. A further disadvantage of the adsorption dryer is that it is difficult to exchange the heat of warm and humid regeneration air in an inexpensive fashion. In other words, a gas/gas heat exchanger is necessary, and therefore usually just the warm and humid regeneration air is released outdoors. Otherwise, by heat exchange/condensation of moisture it is possible to recover the supplied power as heat, thereby avoiding wall ducts.

The condenser dryer, is built more or less like an ordinary refrigerating or freezing machine. Humid air is dehumidified by contacting the cold surface of the evaporator. The condenser dryer has good operation economy and can process air having a high moisture content and a high temperature. The supplied power remains in the room, and humid hot air need not be wasted outdoors. However, the condenser dryer suffers from the drawback that a compressor having a driving motor is necessary. In continuous operation, the life of the most expensive components of the dryer will be just about a year. A further drawback of the condenser dryer is that it contains FREON fluorocarbon, which, as is well known, is a much discussed substance these days from the environmental point of view. Besides, the condenser dryer is relatively expensive, possibly excluding the smallest orders of size, which can use components manufactured in very large series for the refrigerator industry.

The absorption dryer requires good phase contact between a liquid drying agent and the humid gas. This can be accomplished in a number of ways. A common technique is to establish such phase contact in a column containing fillers. As a rule, the drying agent is sprayed over the column packing at the head of the column, while the humid air is introduced countercurrently at the bottom of the column. A problem in columns is that it is difficult for this construction, owing to its geometry, to dispose of the heat of reaction by thermal radiation. In fact, considerable amounts of heat are generated when water vapour from the humid gas is absorbed in the liquid drying agent, which besides also applies to the adsorption dryer. A higher operating temperature and lower efficiency must thus be accepted, since efficiency decreases as the operating temperature rises. Alternatively, refrigerating coils can be arranged in the column packing, or the liquid drying agent can be removed at several levels, then be cooled and be fed back again. Another technique of avoiding too great a rise in temperature is to use highly intensive pumping-around of the drying agent through the column and through an external cooler. Part of this flow is then concentrated continuously in a boiler.

A further common construction is based on the spray-drying technique. A fine mist of the liquid drying agent encounters the humid air countercurrently in a tubular reactor. In this construction, it will be very difficult to have the dry exit air completely free from droplets of the drying agent, and moreover the thermal problems are the same as in the preceding case.

A third variant of the absorption dryer is a contact means having the structure of corrugated fibreboard, flutes extending in two directions perpendicular to each other, the material being permeable to liquid but impermeable to gas. The liquid drying agent can be sprinkled on a body of the material so as to flow down through the vertical flutes, and air can be injected through the remaining horizontally oriented flutes. Also in this case the thermal problems or restrictions as mentioned above will appear. Otherwise, the principle uses the condition of concentrated liquid drying agent permeating the walls of the air flutes, encountering humid air and absorbing water, which diffuses towards a more concentrated drying agent solution in the adjoining drying agent flutes. This technique, however, has its limitations, viz. a limitation of the diffusion of the wall material in the corrugated structure. The geometric interface per unit of volume will also be relatively small, which results in a low capacity per unit of volume of corrugated contact material.

SUMMARY OF THE INVENTION

In the light of what has been discussed above, the main object of the present invention is to provide a new design of an absorption dryer, in which the thermal radiation of the heat of reaction is good, i.e. the increase in temperature in the contact material is small, and the diffusion paths for the reactants, i.e. water vapour and liquid drying agent, at the point of reaction in the contact material are short. A further object of the invention is to provide a design which is simple and, thus, reliable and inexpensive to manufacture and to service. Further objects of the invention will be obvious to those skilled in the art from the more detailed description of the invention that follows below.

More specifically, the invention relates to an absorption dryer of the type which is adapted especially to dry humid gas, humid air of course being the most common field of application in practice. The term "humid" is besides to be understood in a wide, general sense, since the inventive principle is of course also applicable to a case in which a gas is "humid" with some liquid other than water.

The main components of the absorption dryer according to the invention are the same as those of an absorbent dryer of prior-art type, viz. means for supplying the humid gas, means for supplying a liquid drying agent, contact means for establishing contact between the humid gas and the liquid drying agent, such that the drying agent absorbs moisture from said gas, and means for regenerating the liquid drying agent for renewed use in the dryer. The objects of the invention are, however, achieved by a special structure and design of the solid material constituting the reaction surface between the humid gas and the liquid drying agent, and therefore the following description of the invention will in the first place be directed to the design and function of the contact means at issue. The remaining means included in the dryer will be slightly touched upon when certain concrete embodiments of the invention will be elucidated, but basically these means are constructed in the same manner as before and also have the same function as before and therefore need not be described in more detail here.

Moreover, the inventive dryer can of course include further optional components, which are per se known and thus need not be elucidated here. Some of these further optional components will, however, be discussed below in the description of concrete embodiments.

The novelty of the absorption dryer according to the invention is that the contact means for establishing contact between the humid gas and the liquid drying agent comprises at least one fabric structure or fabric-like structure, whose threads, which may have a yarn-like structure, are of such a nature that they can absorb and convey the liquid drying agent after being soaked therewith via the means for supplying the liquid drying agent and whose apertures are adapted to let through the humid gas, which is introduced via the means for supplying thereof, whereby the contact between the humid gas and the drying agent occurs essentially radially in respect of the threads in said structure, the drying agent preferably being in the plane of the fabric structure and the gas perpendicular thereto through said apertures.

In the present case, the term fabric structure is used in the generally recognised meaning for fabric or woven fabric, i.e. basically a fabric made from yarn by weaving and usually characterised in that two or more systems of threads, which intersect at a constant angle, each thread winds in a plane over and under other threads. This, of course, represents the basic composition of the fabric structure, which does not necessarily mean that crossing at a constant angle must always occur, although regular stitches are of course preferred. Thus, a variety of carpet structures, e.g. of the type wall-to-wall carpet with open pile or uncut pile, as well as knitted and crochet structures can be used.

Besides, the term fabric means that most cases concern one- or two-dimensionally determined goods having low flexural rigidity and such connection as to allow handling in the spread state.

A structure corresponding to the fabric structure can, however, be achieved without any actual weaving, i.e. without the threads running over and under each other. Thus, it may also be a matter of a fabric-like structure, which is frequently designated e.g. nonwoven material or nonwoven fabric. In such a material, the mesh apertures in the woven structure must, of course, be equivalent to apertures provided in said nonwoven fabric in some way or another. These apertures can be provided for instance by through perforations in a bonded material.

Finally, it should be added that, although this will probably be indirectly apparent to those skilled in the art, the term thread and the like is in the present case used in a wide sense and is frequently to be placed on a level with yarn or an accumulation of fibres, for instance as present in a nonwoven product of the Chifonet® type (between two neighbouring apertures therein). This meaning is in itself generally accepted since use is often made of the term thread to designate yarn when considered to be an individual object.

Expressed in another way and including certain preferred embodiments thereof, the specific structure and design of the contact means in the dryer according to the invention can be summarised as follows. The solid structure of the contact means consists of a fabric structure which, seen in relation to the geometrical surface, is relatively thin and in which the liquid drying agent flows through the structure, while humid gas is blown or sucked therethrough in a direction which is substantially perpendicular to the flow of the drying agent and perpendicular to the surface of the structure. The important thing of the invention is the intimate and repetitive, finely divided contact which is accomplished between the drying agent and the humid gas owing to the drying agent in the threads of the fabric structure being extremely easily accessible to the humid gas. They may be said to be exposed all around, which means that the diffusion paths in the liquid phase will be extremely short. Diffusion does not occur in the direction of a plane as in a corrugated structure according to prior-art technique, but substantially circularly, concentrically around each fibre or accumulation of threads between two neighbouring apertures. This accumulation may be of circular cross-section, if the fabric consists of yarn, and of square or rectangular cross-section in the case of perforated nonwoven fabric and the like. In all cases, the structure is thin, almost two-dimensional in a layer of the contact material.

Further it is extremely important that the pressure drop is small in an absorption dryer. In fact, a pressure drop consumes power and, besides, there is a greater risk that droplets of the drying agent are entrained by the passing air if the pressure drop is great. The contact means according to the present invention can be given such a design that a minor pressure drop arises. For optimum structure, the fabric should therefore not be so close that the liquid drying agent, under the action of capillary forces and the wetting tendency of the fabric material, forms a coherent film across the entire surface. In that case, the pressure drop will be unreasonably great, and if gas should in any case be blown through such a structure, the waste of drying agent will be greater. The liquid phase forms bubbles, which burst, whereby the drying agent is entrained by the air. Liquid drying agents are often viscous, and therefore the tendency of blocking the apertures in a fabric structure is considerable. Moreover, the fabric or the fabric-like structure should be dimensioned such that the number of apertures are not too few per unit area or too large, since in that case the humid gas does not get the necessary close contact with the fibres wet with the drying agent. Besides, the fabric should have a sufficient total cross-sectional area to allow the required amount of drying agent to be conveyed. This amount is of the same magnitude as the expected water absorption owing to generally known physical data. This is a consequence of the fact that the moisture-absorbing capacity of the drying agent decreases as the concentration falls, i.e. as the water absorption increases. Thus, it must be seen to it that the apertures of the fabric for the humid gas are both sufficiently frequent and, for preventing wetting/film formation over the apertures, sufficiently large. It may then be easy to reach a deadlock, viz. a relatively rough structure, in which the fibres are collected in skeins and there are relatively large openings between the skeins, in which case these thick skeins make the drying agent "have time to" flow away without being exposed to the humid air to the extent desired. Sufficiently large apertures in the fabric result, as stated above, in the contact with the humid gas being poor. It will therefore be necessary to reach a compromise between on the one hand the desire for small air holes and thin skeins of fibres, both occurring frequently, and, on the other hand, the desire for a large, liquid-conveying cross-sectional area and the requirement that the gas apertures not be clogged. The compromise is necessary since a certain drying capacity per unit area is required. It would otherwise be possible to operate with a very large fabric for a small air flow, since in that case the pressure drop would be small even if the pores were small and the cross-sectional area of the fabric would be sufficient.

An important and fundamentally distinguishing feature of the dryer according to the invention and a dryer having the corrugated structure as described above is best elucidated when observing a small surface element of the drying agent contact means of the two dryers. In a dryer according to the invention, the contact between the humid gas and the drying agent occurs essentially "radially" in respect of the threads and preferably substantially in cross-flow, the drying agent being in the plane of the fabric and the gas perpendicular thereto, i.e. through the apertures. In the corrugated structure, the flow is also a cross-flow, but both flows being in the plane, or rather on both sides of a separating wall in the plane.

As will be obvious from that stated above, a preferred embodiment of the inventive dryer is represented by the case in which the fabric structure or the fabric-like structure is a well-balanced compromise between the desire for thin threads, the desire for small air holes, and the desire for a close frequency of threads and holes. These three desires, which all promote a good and efficient phase contact, a condition of a good capacity, should, however, be adapted to the requirement for a large, liquid-conveying cross-sectional area, which otherwise easily becomes the capacity-restricting factor, and the requirement that the holes for the gas not be blocked by the liquid drying agent at the pressure drops that may be accepted. The above-mentioned requirements act in the opposite direction compared with the above-mentioned desires, viz. towards thicker threads and larger air holes, resulting in a lower frequency of both holes and threads. Such a compromise still being possible, with a layer of fabric or fabric-like material, is shown and described in an embodiment below, a common scouring cloth acting as contact means.

Another embodiment of the invention is represented by the case in which the contact means is arranged substantially vertically in the dryer, such that the drying agent flows from the top downwards through the structure under the action of gravitation and capillary forces through the fabric, while the means for supplying the humid gas is arranged to blow or suck the gas substantially horizontally, i.e. substantially perpendicular to the flow of drying agent.

A further preferred embodiment of the invention is represented by the case in which the threads are composed of fibres of a hydrophilic material, when the drying agent usually is an aqueous solution of some drying agent which is per se known, for instance lithium chloride. Although the invention is not restricted to a special dimension of the threads in a respect other than expressed functionally, as mentioned above regarding the function of the dryer, a preferred average dimension of the threads at issue is in the range of 0.1–10 mm, particularly in the range of 0.5–2 mm.

Nor is the mesh or the size of the apertures critical in absolute figures, since as mentioned above the function is the primary thing in the context, but a preferred range for said apertures is 0.25–10 mm, particularly 0.5–2.5 mm. By apertures is, of course, in most cases meant the side edge of the apertures, especially if the apertures at issue usually are square, or otherwise generally the diagonal of the aperture.

The case of a single layer of fabric in the contact means does frequently not represent the optimum case. Thus, the contact means usually comprises a plurality of separate fabric structures or fabric-like structures, which should then be separated by spacing means. The separation is necessary in practice, since several fabric layers, as mentioned above arranged one above the other, would otherwise stick together, such that the majority of the apertures would be blocked by neighbouring layers of fabric. The probability of the apertures coinciding, i.e. lying one above the other, is in fact almost non-existent. As spacing means, use is preferably made of an intermediate netting having a mesh size greater than that of the fabric structure or the fabric-like structure. Such a plastic netting makes the permeability to air excellent in all layers of fabric. Practical experiments have shown that the pressure drop will be very small and is proportional to the number of layers of fabric. The great advantage of several layers of fabric is the fact that the cross-sectional area of the liquid-conveying fibres can be made sufficiently large despite a large aperture area and without necessitating collection of the fibres in thick skeins. Moreover, practical experiments have shown that the drying capacity is approximately proportional to the number of layers of fabric, at least up to 10 layers. As a non-restrictive example of a spacing netting, mention can be made of a plastic netting having large meshes, for instance one of the Engtex make, which is a knitted plastic netting having a mesh size of 5×5 mm.

The above described design of the contact means according to the invention results in a sufficient cross-sectional area of the liquid-conveying fibres at a reasonable size of the contact means. Besides, use can be made of a sufficiently thin fabric, such that the contact between the liquid drying agent and the humid gas becomes efficient while the relatively large apertures offer a desirably small pressure drop of the gas and counteracts the risk of clogging. By arranging a plurality of fabric structures in several layers separated by intermediate spacing means, and the fact that the apertures in neighbouring fabric layers do not, in all probability, lie one above the other, the air is compelled to pass through the structure in a zigzag. This in turn makes the contact between the wet fibres and the humid gas in the fabric layers at issue more efficient. The advantage of several, separated thin fabrics is, in addition to a sufficient total cross-sectional area for the liquid phase and a sufficient total open area for the gas, that the capacity is fairly constant along the height of the contact means. This is a consequence of the gas being sucked or blown in cross-flow through the fabric layers, while the liquid drying agent is supplied to the fabric layers at the upper horizontal edges thereof (when vertically arranged). In the upper part of the contact means, the gas has already been dehumidified after passing one or a few individual fabric layers. The solution in these layers is consumed relatively quickly, and therefore these innermost fabric layers do not yield the same good dehumidification further down in the structure. On the other hand, the drying agent in the outer fabric layers is hardly used at all since the gas is already dehumidified, but this drying agent is of use only when it reaches down a distance in the contact means, where it encounters non-dehumidified gas. This can be readily expressed as the reaction zone being moved outwards as the distance from the top increases. If the dimensions are exactly correct, the reaction surfaces should therefore be farthest out at the bottom of the dryer.

However, it should be noted in this context that, although in the specified case the fabric structure consists of several layers, it should still be a thin structure, among other things to make it easier for the heat of reaction to radiate.

If a single layer of fabric or fabric-like structure should, in an individual case, prove to be insufficient, this need not necessarily imply that a construction must be applied having a number of separate fabric structures, one arranged above the other. Within the scope of the invention, it will thus also be possible to weave, or provide in some other fashion, complex fabric structures or fabric-like structures, for instance having a plurality of different kinds of threads or thread thicknesses of different materials and having different wetting properties, thereby obtaining a fabric structure which results in excellent performance with a single layer of fabric. An embodiment of the contact means is represented by the case in which this consists of a folded fabric structure of one layer of fabric. The gas being blown or sucked substantially perpendicular to or through the fabric also applies to this case of a folded fabric, if the folded structure is regarded as contact means.

Instead, the idea behind the invention can be generally expressed such that the contact means is a single or complex fabric, in one or more layers, having such a scattered and fine-threaded pore system for the liquid drying agent that thick films or streaks of liquid do not form. The apertures or the pore system for the humid gas must, however, be sufficiently scattered or have sufficiently large pores, thereby preventing capillary forces in coaction with the wetting tendency of the material from causing blocking of the gas pores with the liquid phase. Further the apertures must occur frequently.

Even if the threads or fibres of the fabric preferably are made of a hydrophilic material as mentioned above, this does not exclude the use of a fabric of some hydrophobic material, whereby the gas apertures could be allowed to be smaller and, thus, more in number, which in turn would result in a more efficient fabric, without increasing the risk of blocking of the gas pores. One might also imagine that a fabric which actually has too fine pores in respect of the risk of blocking of the gas pores or apertures could, by impregnation with some hydrophobic material, be given quite different properties with improved gas permeability in its wet state. This is, however, just one of a plurality of various possibilities of developing a suitable fabric structure. As indicated above, the invention thus is not restricted to a specific fabric or fabric structure.

The fabric structure need not necessarily be arranged as a freely hanging cloth or the like. A preferred embodiment can in some cases instead be represented by the case in which the fabric structure is formed as a cylinder. Such a cylinder is preferably arranged upright, i.e. its main axis extending substantially vertically. Such an arrangement has been found practical in, for instance, drying capacities of up to some twenty or thirty kg of water per hour. In the event of greater capacities, the diameter or height can, however, be impractically great. A solution to this problem may, for instance, be an arrangement of the fabric in a plurality of substantially parallel planes with partition walls or spacing means, and means for supplying gas and means for ejecting gas and supply of the drying agent at the upper edge.

As an example of the capacity of a dryer according to the invention it may be mentioned that a scouring cloth of common consumers' quality, having a woven yarn-like structure with threads/yarn having a diameter of 1–2 mm and apertures of about the same size at a surface of 15 dm$^2$, resulted in a water absorption of 300 g/h at a relative humidity of 75% and at an air flow of 75 m$^3$/h. The scouring cloth was arranged as a cylinder having a diameter of 16 cm and a length/height of about 60 cm. The humid air was blown in through one end wall and left radially through the cloth, while 40% lithium chloride in an amount of about 500 g/h was flushed over the scouring cloth from above. It should be added that this example does not in any way represent the optimum case, but intends only to exemplify an extremely simple but still relatively efficient dryer according to the invention, having a layer of relatively thick fabric and, consequently, in this simple structure, relatively thick skeins and large apertures for the gas. The pressure drop of the gas/air was 16 mm water column, which is the greatest possible pressure drop with reasonable fans, and therefore a fabric of this type is not convenient in multilayer-designs of the contact means.

As a non-restrictive example of a fabric material for use in the contact means according to the invention, the fabric which is commercially available under the trademark Chifonet can be mentioned, i.e. the product which is normally used as scouring cloth. Such a product represents a fabric-like structure with holes or apertures, which constitute about 50% of the fabric surface. A preferred range of the percentage of apertures or holes in a fabric structure or fabric-like structure according to the invention in general can be 10–90%, especially 30–70%. As an example of a dryer according to the invention with a thin non-woven product of the type stated above, it may be mentioned that this yields the same water absorption under the same conditions as in the scouring cloth case above, however, at a pressure drop of the gas, which cannot even be measured. Such a fabric thus is perfect in a multilayer-arrangement for higher capacity.

As mentioned above, the inventive dryer comprises, in addition to the new contact means, means for supplying the humid gas, means for supplying the liquid drying agent, and means for regenerating the drying agent at issue for renewed use in the dryer. These means are per se known in the context of drying and therefore need not to be described in more detail here. What may possibly be added is that the means for supplying the drying agent should, of course, be a suitable means which feeds and distributes the drying agent uniformly or homogeneously over the fabric-like structure, preferably at the upper edge thereof in a vertical arrangement.

The inventive dryer may also, if required, comprise one or more of the following components which are previously known: condenser for utilising the heat of steam formation from the means (boiler) for regenerating the drying agent; one or more pumps for respectively diluted and regenerated drying agents; one or more fans for blowing or sucking the gas through the contact means and optionally through the condenser; a heat exchanger between hot, regenerated drying agent from the regenerating means and cold, diluted drying agent from the contact means; and an additional cooler for the drying agent before the contact means. The construction and function of these additional optional components will be well known to those skilled in the art and will therefore not be described in more detail here.

In a second aspect, the invention relates to the new contact means itself, i.e. a contact means adapted to be used in an absorption dryer, the contact means being distinguished by comprising at least one fabric structure or fabric-like structure, whose threads are of such a nature that, after being soaked with a liquid drying agent, they can absorb and convey the drying agent, and whose apertures are adapted to let through humid gas, for instance humid air, whereby the contact between the humid gas and the drying agent is adapted to occur essentially radially in respect of the threads in said structure, the drying agent preferably being in the plane of the fabric structure and the gas perpendicular thereto through said apertures.

To the preferred embodiments of the new contact means according to the invention, the same features apply as discussed above in connection with the new absorption dryer according to the invention, and therefore these embodiments need not be repeated once more.

BRIEF DESCRIPTION OF THE DRAWINGS

An embodiment of the invention will now be elucidated in more detail with reference to the accompanying drawing. FIG. 1 illustrates an absorption dryer according to the invention.

DETAILED DESCRIPTION

An absorption dryer according to the illustrated preferred embodiment includes the following components:

1. Contact means
2. Pump
3. Pump
4. Additional cooler
5. Heat exchanger
6. Boiler
7. Condenser
8. Fan
9. Distribution device The figure also shows the following flows:

A: Humid supply air
B: Outlet water
C: Dry exit air

The function of this specific embodiment of the inventive dryer can be described as follows.

The contact means 1 of the invention consists in this case of 10 layers of Chifonet fabric with intermediate layers of a spacing netting of the Engtex make, said netting having a mesh of about 5×5 mm. In this case, the contact means is formed as an upright cylinder having a diameter of 20 cm and a height of 16 cm. The wall thickness is about 9 mm.

Humid air is sucked in through the circumferential surface of the contact means (arrows designated A) by the negative pressure produced by the fan 8. The air flow is about 200 m³ and the negative pressure about 10 mm water column. The pump 3 feeds concentrated lithium chloride to the distribution device 9, which in this case is a perforated hose in the form of a circle having the same diameter as the contact means. This results in the upper horizontal edge of all the fabric layers being soaked with the solution. The pump 3 sucks concentrated, hot (about 140° C.) solution from the boiler 6. This is a glass jar having a volume of about 5 l and a built-in immersion heater and thermostat.

On its way to the pump 3, the distribution device 9 and the contact means 1, the solution passes first a heat exchanger 5 and then an additional cooler 4. The concentrated lithium chloride must be relatively cool when reaching the contact means, on the one hand because then it absorbs moisture better (the lower the temperature) and, on the other hand, because the polymeric plastic materials of the contact means usually do not withstand a temperature exceeding about 70° C. The heat exchanger 4 is a small laboratory cooler made of glass. The flow amounts to about 6 l/h. Heat exchange is effected against the cold diluted flow of the dryer, as will be described below. After passing through the heat exchanger 5, the concentrated flow still has a somewhat too high temperature, about 60° C., and is therefore cooled to about 30° C. by means of an additional cooler 4, which here is an about 3-m-long, narrow polyethylene hose arranged in front of the suction side of the fan 8. This position is, however, not to be seen in the Figure.

On its way down through the contact means, the concentrated solution absorbs water from the air. The solution becomes slightly warmer, about 40° C., depending on the heat of reaction, despite the powerful sucking-through of air. The volume of the solution then increases from about 6 l/h to about 9 l/h.

The cold diluted flow from the dryer is sucked via the pump 2 from a collecting vessel (not shown) in connection with the contact means and is conveyed through the heat exchanger to the boiler. The heat exchanger has the double function of cooling the warm flow as mentioned above, while transferring some of the heat to the boiler. The cold diluted solution is now preheated to about 80° C. before reaching the boiler. This increases the efficiency of the dryer to a considerable extent. In the boiler, the solution is regenerated by boiling away water, which in the shown case occurs in an amount of 3 l/h. The power of the heater is 2200 Watt which represents a power requirement of barely 0.8 kWh/kg of water absorbed from the air. This can be compared with, for instance, a value of 1–1.5 kWh/kg of water as a common value for commercially available dryers.

The water vapour is then condensed in a condenser 7, which in this case is a small (20×20×5 cm) standard-type condenser as used in cryogenic engineering. It goes without saying that it is not necessary to condense the water vapour, but since in most cases one wants to utilise the heat in the form of the supplied electrical energy for heating the space in which the dryer operates, this is a simple technique. It may here also be added that the purpose of a dryer of the invention is relatively simple, viz. condensing pure water vapour and not a mixture of air and water vapour, such as is the case of the regeneration air from adsorption dryers. It is worth noticing that in some cases one would obtain a net cooling in a space owing to the evaporation/drying, if the heat of condensing was not utilised.

In the present case, it constitutes an additional advantage that the same fan, which is a simple axial fan, manages the conveyance of air through both the contact means and the condenser owing to the fact that a small pressure drop could be given to both of them. Besides, the pumps are of a simple, inexpensive and reliable type, viz. so-called oscillation pumps.

Finally, the designations B and C schematically illustrate the removed water in the liquid state and the warm, dehumidified exit air, respectively. The conditions in the exemplified case was an air temperature of 22° C. and a relative humidity of 80%.

I claim:

1. An absorption dryer for drying humid gas with a liquid drying agent, comprising:

means for supplying a humid gas;

means for supplying a liquid drying agent;

contact means for establishing contact between the humid gas and the liquid drying agent such that the drying agent absorbs moisture from the gas;

means for regenerating the liquid drying agent for renewed use in the dryer the contact means including at least one fabric structure, the fabric structure having threads that absorb and convey the liquid drying agent after being soaked therewith via the means for supplying the liquid drying agent, the fabric structure having apertures that let through the humid gas introduced via the means for supplying the humid gas, the apertures being so frequent and so large as to prevent wetting and film-forming over the apertures, wherein the contact means establishes contact between the humid gas and the drying agent such that contact occurs essentially radially relative to the threads in the fabric structure, and the drying agent is disposed in a plane of the fabric structure and the humid gas is supplied by the means for supplying the humid gas perpendicular to the plane of the fabric structure and passes through the apertures.

2. The absorption dryer as claimed in claim 1, wherein the threads of the fabric structure are sufficiently spaced and are sufficiently thin to prevent formation of films of the liquid drying agent in the thread network and over the apertures.

3. The absorption dryer as claimed in claim 1, wherein the threads are composed of fibers of a hydrophilic material.

4. The absorption dryer as claimed in claim 1, wherein the contact means is arrange, substantially vertically in the dryer, such that the drying agent flows from a top of the contact means downwards through the fabric structure under the action of gravitation and capillary forces through the fabric structure, and the means for supplying the humid gas is arranged to force the humid gas substantially horizontally.

5. The absorption dryer as claimed in claim 4, wherein the supply means for the drying agent is is disposed relative to the contact means such that it supplies the drying agent at an upper edge of the contact means.

6. The absorption dryer as claimed in claim 1, wherein the threads have a dimension in the range of 0.1–10 mm.

7. The absorption dryer as claimed in claim 1, wherein the apertures have a dimension in the range of 0.25–10 mm.

8. The absorption dryer as claimed in claim 1, wherein the fabric structure is a cloth.

9. The absorption dryer as claimed in claim 1, wherein the contact means includes a plurality of separate fabric structures separated by spacing means in the form of intermediate netting having a greater mesh than a mesh of the fabric structure.

10. The absorption dryer as claimed in claim 1, is in the form of a cylinder.

11. The absorption dryer as claimed in claim 1, wherein a percentage of apertures in the fabric structure is 10–90% of an area of the fabric structure.

12. The absorption dryer as claimed in claim 1, wherein the contact means includes a folded fabric structure.

13. A contact means for an absorption dryer, comprising:

at least one fabric structure the fabric structure having threads that are adapted to absorb and convey a liquid drying agent after being soaked therewith and having apertures that are adapted to let through a humid gas, the apertures being sufficiently frequent and large to prevent wetting and film-forming over the apertures, wherein, in use, contact between the humid gas and the drying agent occurs essentially radially relative to the threads of the fabric structure, and the drying agent is disposed in a plane of the fabric structure and the humid gas is supplied in a direction substantially perpendicular to the fabric structure and passes through the apertures.

14. The absorption dryer as claimed in claim 2, wherein the threads are composed of fibers of a hydrophilic material.

15. The absorption dryer as claimed in claim 2, wherein the contact means is arranged substantially vertically in the dryer, such that the drying agent flows from a top of the contact means downwards through the fabric structure under the action of gravitation and capillary forces through the fabric structure, and the means for supplying the humid gas is arranged to force the humid gas substantially horizontally.

16. The absorption dryer as claimed in claim 4, wherein the threads have a dimension in the range of 0.1–10 mm.

17. The absorption dryer as claimed in claim 4, wherein the apertures have a dimension in the range of 0.25–10 mm.

18. The absorption dryer as claimed in claim 4, wherein the fabric structure is a cloth.

19. The contact means of claim 13, wherein the threads of the fabric structure a resufficiently spaced and are sufficiently thin to prevent formation of films of the liquid drying agent in the thread network and over the apertures.

* * * * *